US011079074B2

(12) United States Patent
Shin et al.

(10) Patent No.: US 11,079,074 B2
(45) Date of Patent: Aug. 3, 2021

(54) LIGHTING DEVICE AND VEHICULAR LAMP COMPRISING SAME

(71) Applicant: LG INNOTEK CO., LTD., Seoul (KR)

(72) Inventors: Jin Gwan Shin, Seoul (KR); Jin Hee Kim, Seoul (KR); Jae Yun Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 333 days.

(21) Appl. No.: 15/780,766

(22) PCT Filed: Dec. 2, 2016

(86) PCT No.: PCT/KR2016/014081
§ 371 (c)(1),
(2) Date: Jun. 1, 2018

(87) PCT Pub. No.: WO2017/095170
PCT Pub. Date: Jun. 8, 2017

(65) Prior Publication Data
US 2020/0241197 A1   Jul. 30, 2020

(30) Foreign Application Priority Data
Dec. 2, 2015  (KR) .................. 10-2015-0170370

(51) Int. Cl.
*F21S 41/141*   (2018.01)
*F21K 9/61*   (2016.01)
(Continued)

(52) U.S. Cl.
CPC ............... *F21K 9/61* (2016.08); *B60Q 1/02* (2013.01); *B60Q 1/26* (2013.01); *F21S 41/141* (2018.01);
(Continued)

(58) Field of Classification Search
CPC ........................................................ F21S 41/24
See application file for complete search history.

(56) References Cited

U.S. PATENT DOCUMENTS 4,974,354 A * 12/1990 Hembrook, Jr. ....... B60Q 1/503
340/470
5,027,258 A * 6/1991 Schoniger ............ G02B 6/0023
362/629

(Continued)

FOREIGN PATENT DOCUMENTS

JP   2013-218059 A   10/2013
KR   10-2014-0078373 A   6/2014
KR   10-2014-0078376 A   6/2014

OTHER PUBLICATIONS

English Machine Translation of KR20140078373A provided by ESPACENET (Year: 2014).*

(Continued)

*Primary Examiner* — Zheng Song
(74) *Attorney, Agent, or Firm* — Saliwanchik, Lloyd & Eisenschenk

(57) ABSTRACT

The present disclosure relates to a lighting device and a vehicular lamp including the same. A lens member is provided between a shielding module and a light guide member. Through a non-air-gap structure in which a separation portion between components is removed, diversity of mechanism designs may be secured, and at the same time, light efficiency may be improved. A light emitting direction of a light emitting element forms an inclination angle with a light emitting surface of a light source module, so that a deterioration phenomenon of a light guide member formed of resin may be removed, and a light beam emitted through a first light guide member is emitted as an indirect light beam.

20 Claims, 2 Drawing Sheets

(51) Int. Cl.
*F21V 7/28* (2018.01)
*B60Q 1/02* (2006.01)
*B60Q 1/26* (2006.01)
*F21V 8/00* (2006.01)

(52) U.S. Cl.
CPC .............. *F21V 7/28* (2018.02); *G02B 6/0025* (2013.01); *G02B 6/0028* (2013.01); *G02B 6/0031* (2013.01); *G02B 6/0043* (2013.01); *G02B 6/0055* (2013.01); *G02B 6/0058* (2013.01); *G02B 6/0068* (2013.01); *G02B 6/0091* (2013.01)

(56) References Cited

U.S. PATENT DOCUMENTS

| | | | | |
|---|---|---|---|---|
| 6,412,969 | B1 * | 7/2002 | Torihara | G02B 6/0021 349/62 |
| 6,874,922 | B2 * | 4/2005 | Matsuura | B60Q 1/56 362/497 |
| 8,096,671 | B1 * | 1/2012 | Cronk | F21S 2/005 362/147 |
| 8,770,812 | B2 * | 7/2014 | Kino | B60R 13/04 362/559 |
| 2005/0219860 | A1 * | 10/2005 | Schexnaider | F21S 9/022 362/601 |
| 2007/0006493 | A1 * | 1/2007 | Eberwein | G02B 6/0021 40/204 |
| 2009/0115711 | A1 * | 5/2009 | Ueyama | G02B 6/0068 345/87 |
| 2009/0251920 | A1 * | 10/2009 | Kino | B60Q 1/323 362/602 |
| 2011/0222280 | A1 | 9/2011 | Kim | |
| 2014/0151734 | A1 | 6/2014 | Ito et al. | |
| 2014/0211449 | A1 * | 7/2014 | Nomura | F21S 43/14 362/84 |
| 2015/0176801 | A1 * | 6/2015 | Takatori | G02B 19/0028 362/97.1 |
| 2015/0309248 | A1 * | 10/2015 | Xu | G02B 6/006 362/607 |
| 2015/0338064 | A1 * | 11/2015 | Ishino | G02B 6/0023 349/61 |
| 2015/0345740 | A1 * | 12/2015 | Watanabe | F21S 43/14 362/517 |
| 2016/0284674 | A1 * | 9/2016 | Kim | H01L 25/0753 |

OTHER PUBLICATIONS

International Search Report in International Application No. PCT/KR2016/014081, filed Dec. 2, 2016.

* cited by examiner

LIGHTING DEVICE AND VEHICULAR LAMP COMPRISING SAME

CROSS-REFERENCE TO RELATED APPLICATIONS

This application is the U.S. national stage application of International Patent Application No. PCT/KR2016/014081, filed Dec. 2, 2016, which claims priority to Korean Application No. 10-2015-0170370, filed Dec. 2, 2015, the disclosures of each of which are incorporated herein by reference in their entirety.

TECHNICAL FIELD

The present disclosure relates to a lighting device and a vehicular lamp including the same.

BACKGROUND ART

A lighting unit, which is used in an electronic device and utilizes various light sources, is implemented in a manner in which a suitable light source is utilized according to characteristics of the electronic devices so that light efficiency is improved.

In recent years, such a lighting unit used in the electronic device may be variously applied to a backlight unit applied to a flat panel display, an indoor light used in an indoor environment, a head light, a fog light, a retraction light, a car light, a number light, a tail light, a brake light, a turn signal light, and an emergency flashing light installed outside a vehicle, and an indoor light installed inside the vehicle.

These lights are mostly handled in terms of the brightness of a surface light source by applying a member such as a light guide plate that provides a light beam and efficienates transmission of the light beam.

However, when the surface light source is mounted on various places such as a vehicular lamp, designing for mounting is not easy, and It is difficult to satisfy North American AMECA standards that should be satisfied for export.

Further, there is a problem in that it is difficult to implement the lights themselves slimly while securing desired uniformity of lights at a limited place due to limitation of the lights which can only be provided with a certain standard and a certain configuration.

DISCLOSURE

Technical Problem

Embodiments of the present disclosure, which are conceived to solve the above-described problems, provide a lighting device which includes a lens member between a shielding module and a light guide member, thereby securing diversity of mechanism designs through a non-air-gap structure in which a separation portion between components is removed, while improving light efficiency. In the lighting device, an inclination angle is formed between a light emitting direction of a light emitting element and a light emitting surface of a light source module, a hot spot phenomenon of the light guide member formed of resin is removed, and a light beam emitted through a first light guide member may be emitted as an indirect light beam.

Technical Solution

To solve the above-described problems, embodiments of the present disclosure provide a lighting device including a shielding module including an opening area in an upper portion of the shielding module and a shielding area extending from the opening area, a light source module disposed inside the shielding module, and a first light guide member disposed inside the shielding module and being in contact with a light emitting surface of the light source module, in which a light emitting direction of a light emitting element inside the light source module forms an inclination angle with the light emitting surface of the light source module.

Advantageous Effects

In an embodiment of the present disclosure, a lens member is provided between a shielding module and a light guide member. Further, through a non-air-gap structure in which a separation portion between components is removed, diversity of mechanism designs may be secured, and at the same time, light efficiency may be improved.

In particular, according to the embodiment of the present disclosure, the light guide member and a lens module are arranged to be in close contact with each other, so that uniformity of light may be secured, and the entire thickness of the module may be reduced.

An inclination angle is formed between a light emitting direction of a light emitting element and a light emitting surface of a light source module, so that a deterioration phenomenon of the light guide member may be removed and a light beam emitted through a first light guide member is emitted as an indirect light beam.

Further, when a lighting device according to the embodiment of the present disclosure is applied to a vehicular lamp, a vehicular lamp that satisfies the North America AMECA standard, may be variously designed, and has a slim structure may be implemented.

Furthermore, a light shielding module having a bracket structure supporting the light source module is formed to shield one area of an upper portion of the light source module, and a light beam emitted by a light source is reflected and recycled by the shielding area, so that an intensity and brightness of a light emitting unit may be increased.

In particular, an upper end of the shielding module may have a bent portion, and the brightness may be adjusted according to a bending angle of the bent portion.

MODE FOR INVENTION

Figure 1:
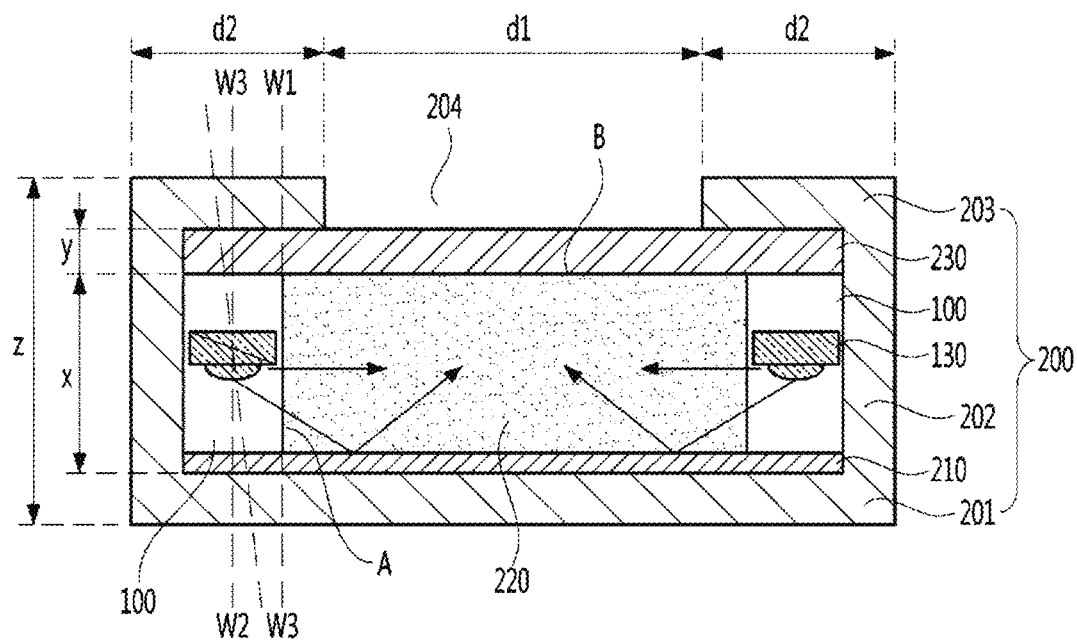
FIG. 1 is a sectional view illustrating a main part of a lighting device according to an embodiment of the present disclosure.

Hereinafter, configurations and effects according to the present disclosure will be described with reference to the accompanying drawings. In description with reference to the accompanying drawings, the same components are designated by the same reference numerals regardless of the reference numerals, and duplicate descriptions thereof will be omitted. Although terms such as first and second may be used to describe various components, the components are not limited by the terms. The terms are used only to distinguish one component from other component(s).

FIG. 1 is a sectional view illustrating a main part of a lighting device according to an embodiment of the present disclosure.

Referring to FIG. 1, a lighting device according to an embodiment of the present disclosure may include a shielding module 200 including an opening area and a shielding area extending from the opening area, light source modules 100 arranged inside the shielding module 200, and a first light guide member 220 arranged inside the shielding module 200 and being in contact with light emitting surfaces A of the light source modules 100. In particular, in this case, an inclination angle θ may be formed between a light emitting direction of light emitting elements 130 inside the light source modules 100 and the light emitting surfaces A of the light source modules 100.

In the embodiment of the present disclosure, since a light emitting surface B of the first light guide member 220 and a lens member 230 are implemented based on such a structure, a separation portion between the two structures is removed, so that a surface light emitting structure having a thinner structure may be implemented, and light distribution may be uniformized. Furthermore, a diffusion member generally used in the conventional lighting device is removed, so that a mechanism fastening structure is simplified, and an exit angle of a light beam may be controlled to remove a hot spot phenomenon generated in a light guide member.

Arrangement and effects of main configurations will be described in detail with reference to FIG. 1.

The shielding module 200, which has a bracket structure, may be implemented with the opening area and the shielding area, and may provide a structure in which a light emitting unit is not viewed when the lighting device is switched off, and outflow of the light beam to the outside is blocked so that brightness may be improved. Since the first light guide member 220 and the lens member 230 are integrally arranged inside the shielding module 200, a separation portion therebetween may be removed, so that the entire thickness of the lighting device may be slimmed, and light efficiency may increase. To this end, the shielding module 200 accommodates the light source modules 100 and the first light guide member 220, and may include a lower surface 201, side surfaces 202 extending upward from the lower surface 201, and bent portions 203 bent from the side surfaces 202 and defining the opening area 204. In the structure illustrated in FIG. 1, when the entire height z of the shielding module 200 is considered, the side surfaces may be defined as a length x+y in which the lens member 230, the light source modules 100, and a reflective member 210 are accommodated, an upper portion except for the length x+y may be defined as the bent portions 203, and a lower portion except for the length x+y may be defined as the lower surface 201.

In particular, the length d2 of the bent portions 203 may be formed to be longer than the transverse width of the light source modules 100. That is, the bent portions 204 may be formed above areas where the light source modules 100 are arranged, and may have a length that is not less than a boundary of the light emitting surfaces A of the light source modules 100. That is, the bent portions 204 may be longer than positions where light sources 130 are mounted in directions of the centers of the light source modules 100. Such a structure may overall function to stably fix components such as the light source modules 100, the first light guide member 220 inside the lighting device, and the lens member 230, and at the same time, may improve visibility from the outside. Further, the structure may reflect a leaking light beam toward the first light guide member 220 again, thereby improving efficiency and concentration of the light beam.

For example, in the shielding module 200 according to the embodiment of the present disclosure, while a light beam emitted by the light emitting elements 130 is reflected by the lower surface 201 of the shielding module 200, passes through the first light guide member 220, and is emitted to the front side, the light beam is reflected by the bent portions 203 above the light source modules 100, and is re-reflected by the reflective member 210 below the first light guide member 220, so that the efficiency and the concentration of the light beam may improved.

The shielding module 200 according to the present disclosure functions to block outflow of the light beam to the outside while surrounding the lower portion and the side surfaces of the lighting device, and at the same time, is formed above the light source modules 100. Thus, as illustrated as an arrow in FIG. 1, the shielding module 200 may block the emitted light beam so as not to be leaked to the outside, and may reflect the light beam to an inside of the lighting device, thereby improving light efficiency. Although such a shielding module 200 may include any one of Al, PC, PP, ABS, and PBT, the present disclosure is not necessarily limited thereto, and all materials that block and reflect a light beam may be used. At this time, when the shielding module 200 is vapor-deposited with Al, the shielding module 200 seems like a mirror if a light source is not switched on, so that an effect that is similar to an organic light emitting diode (OLED) light source may be obtained. Further, although the bent portions 203 of the shielding module 200, which are formed above the light source modules 100, may be vertically fixed to vertical surfaces of the side surfaces 202 of the shielding module 200 as illustrated in the drawing, the bent portions 203 may be adjusted at a predetermined angle. In this case, the brightness may be adjusted according to the angle of the bent portions 203. Further, since the light source and the shielding module 200 are fixed to each other as one set, durability and assemblability may be improved, and an advantage effect may be obtained when the lighting device is designed.

The light source modules 100 may be defined as structures including the light sources 130 including light emitting devices. In particular, the light emitting surfaces of the light sources 130 may be guided at a predetermined inclination rather than directly toward an inside of the first light guide member 220. That is, an inclination angle θ may be formed between the light emitting directions of the light sources 130 and the light emitting surfaces A of the light source modules 100. In this case, the inclination angle θ is defined as an angle between a virtual vertical line W2 passing through the center of the light emitting element 130 and a virtual extending line W1 of the light emitting surface of the light source module 100. In the present embodiment, an example where the light emitting surface of the light emitting element is disposed to face the lower surface 201 of the shielding module 200 (inclination angle is 180 degrees) is illustrated. In this case, a reflected light reflected by the lower surface 201 is transferred to the first light guide member 220, so that a hot spot phenomenon which is a deterioration phenomenon due to a direct light beam of the light emitting element is removed on the upper surface of the first light guide member 220, and an indirect light beam may be provided. In this case, the reflective member 210 may be further disposed between the first light guide member 220 and the lower surface 201, thereby increasing reflectivity. In addition, in the embodiment of the present disclosure, the above-described inclination angle θ is arranged to satisfy a range of 90 degrees to 180 degrees. When the inclination angle θ is 90 degrees, a side-emitting type light emitting device directly transmits a light beam to an inside of the first light guide member 220. Thus, when the inclination angle θ is lower than 90 degrees, the hot spot phenomenon is intensified on the upper surface of the first light guide member 220, and when the inclination angle θ is larger than 180 degrees, since the light beam is not reflected well, uniformity of the light beam is degraded.

The reflective member 210 may be formed in the form of a film, and may include a synthetic resin dispersedly containing a white pigment in order to realize light reflection characteristics and light scattering characteristics. For example, although titanium oxide, aluminum oxide, zinc oxide, lead carbonate, barium sulfate, calcium carbonate, and the like may be used as the white pigment, and polyethyleneterephthalate, polyethylene naphthalate, acrylic resin, colicarbonate, polystyrene, polyolefin, vellulosic acid acetate, weather-resistant vinyl chloride, and the like may be used as the synthetic resin, the present disclosure is not limited thereto. A reflective pattern may be formed on a surface of the reflective member 210, and the reflective pattern serves to evenly transmit the light beam to a diffusive member 140 by scattering and dispersing the input light beam. Although the reflective pattern may be formed by printing reflective ink including any one of $TiO_2$, $CaCo_3$, $BaSo_4$, $Al_2O_3$, silicon, and PS on the surface of the reflective member 220, the present disclosure is not limited thereto. Further, transparent PET may be also used as the reflective member 220 instead of the film. Further, although the reflective pattern may have a plurality of protruding patterns, and may have a dot pattern shape, a prism shape, a lenticular shape, a lens shape, or a combination thereof in order to increase a light scattering effect, the present disclosure is not limited thereto. Further, the cross-sectional shape of the reflective pattern may have various shapes such as a triangle, a rectangle, a semicircle, and a sine wave. Furthermore, the reflective pattern may have different sizes as well as a uniform size, and arrangement density of the reflective pattern may be also adjusted. That is, the size of the reflective pattern increases as the reflective pattern becomes further away from the light source module or an interval between the reflective patterns decreases so that pattern density is increased. When the reflective pattern becomes further away from the light source, light reflectivity increases so that uniformity of the light beam may be secured.

Further, although the light source modules 100 may be arranged to face each other and to be adjacent to the side surfaces 202 of the shielding module 200 as illustrated in FIG. 1, this structure is merely one embodiment. Further, a plurality of light source modules 100 may be arranged to be adjacent to insides of the side surfaces 202 of the shielding module 200. Further, the first light guide member 220 may be arranged between the light source modules 100 facing each other, to guide the indirect light beam to the upper side to emit the light through the opening area 204. The first light guide member 220 may be formed of a photo-curable resin layer such as an ultraviolet curable resin or a thermosetting resin layer. For example, although the first light guide member 220 may be formed of acrylic resin, the present disclosure is not limited thereto. In addition, the first light guide member 220 may be made of all materials, which may perform a light guide function, such as a high transmittance plastic such as polystyrene (PS), polymethyl methacrylate (PMMA), cyclic olefin copoly (COC), polyethylene terephthalate (PET), and resin.

In addition, in the embodiment of the present disclosure, as illustrated in FIG. 1, the lens member 230 is arranged above the first light guide member 220, and is accommodated inside the shielding module 200. That is, in a relationship between the lens member 230 and the lower first light guide member 220, the lens member 230 may be formed in a structure where there is no separation portion (hereinafter, referred to as a "non-air-gap structure").

That is, it is preferable that the lens member 230 is arranged to be in close contact with the first light guide member 220 such that there is no separation portion therebetween. In a general lighting device implementing surface emission, a diffusion member (laminated structure of plurality of optical films) is often formed on a member such as a light guide plate. In this case, since the separation portion for realizing the surface emission is necessarily required to be generally about 10 mm, light efficiency may be reduced and mechanism designing becomes difficult. In the embodiment of the present disclosure, the lens member 230 is formed on the first light guide member 220 in a non-air-gap structure, that is, a structure in which the lower surfaces of the bent portions and the upper surface of the lens member are directly in contact with each other, so that the above-described problems are solved, and thus efficient light diffusion and optical efficiency can be improved.

Figure 2:
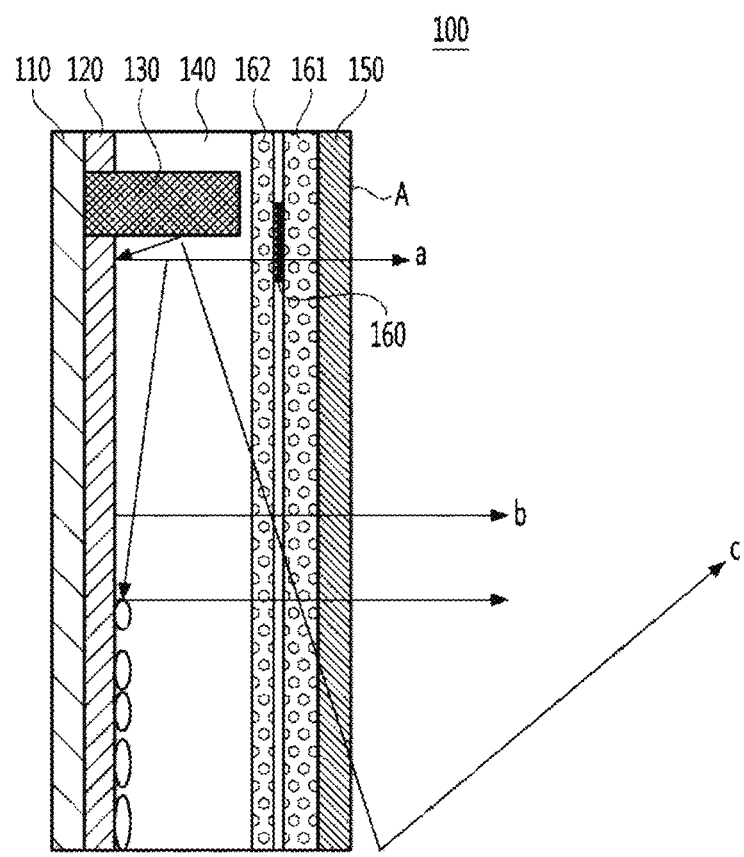
FIG. 2 is a sectional view illustrating an embodiment of a light source module in the lighting device of FIG. 1.

FIG. 2 is a sectional view illustrating a structure of the above-described light source module 100 in the lighting device of FIG. 1.

Referring to FIGS. 1 and 2, the light source module according to the embodiment of the present disclosure may include the light emitting element 130 and a printed circuit board 110 on which the light emitting element 130 is mounted. In this case, as illustrated in FIG. 1, an inclination angle between the light emitting direction of the light emitting element 130 and the first light guide member 220 is formed. The printed circuit board 110 means a substrate on which a circuit pattern is formed, that is, a PCB. In the present disclosure, it is preferable that the printed circuit board 110 is formed of a transparent material. Although the conventional lighting device is opaque since an FR4 printed circuit board is used, a printed circuit board formed of a transparent material, particularly, transparent PET, is used so that a transparent lighting device may be provided. Further, in the present disclosure, a flexible printed circuit board (FPCB) may be formed to secure certain flexibility.

The light emitting element 130 constituting the light source module 100 is a part in which one or more light sources are arranged on the printed circuit board 110 to emit a light beam. The light source 130 according to the present disclosure may be a top view type light emitting diode or a side view type light emitting diode. That is, a light emitting diode that does not emit a light beam directly to the upper side but emits a light beam to the lower side may be used as the light emitting element 130.

Furthermore, the light source module 100 according to the embodiment of the present disclosure may have a structure in which the above-described basic light emitting device and the printed circuit board are provided or may have a structure further including a second light guide member 140 to implement surface light emission, as illustrated in FIG. 2. In this case, the second light guide member 140 is provided on the printed circuit board 110 to diffuse and induce a light beam from the light source 130. A resin layer replacing a light guide plate as well as the conventional light guide plate may be provided as the second light guide member 140. Further, a reflective member 120 may be further provided between the printed circuit board 110 and the second light guide member 140. In this case, the reflective member 120 is formed on the upper surface of the printed circuit board 110, and the light source 130 is formed through the reflective member 120. The reflective member 120 is formed of a material having high reflection efficiency to reflect a light beam emitted from the light source 130 to the upper side where a diffusion member 150 is located, thereby reducing loss of light. The reflective member 120 may be formed in the form of a film, and may include a synthetic resin dispersedly containing a white pigment in order to realize light reflection characteristics and light scattering characteristics. A material and a reflective pattern of the reflective member 120 may be implemented in the same manner as those of the reflective member 210 having the structure of FIG. 1.

In the second light guide member 140 according to the present disclosure, a resin layer may be applied as a light guide member. In this case, the resin layer is applied to the front surface of the light source 130 to be in close contact with the front surface of the light source 130 so as to bury the light source. When the light guide member 140 is formed using the resin layer, the resin layer diffuses and induces the light beam emitted by the light emitting element 130 toward the first light guide member 220. That is, the resin layer is formed to have a structure in which the light source 130 is buried, to function to disperse the light beam emitted by the light source 130 in a lateral direction. That is, a function of the conventional light guide plate may be performed in the resin layer.

The resin layer according to the present disclosure may be basically formed of resin that may spread a light beam. For example, the resin layer according to the present disclosure may be formed of an ultraviolet curing resin containing an oligomer, and more particularly, may be formed of a resin having a urethane acrylate oligomer as a main raw material. For example, a resin obtained by mixing a urethane acrylate oligomer, which is a synthetic oligomer, with a polymer type, which is polyacryl, can be used. Of course, the resin may further include a monomer mixed with isobornyl acrylate (IBOA), hydroxylpropyl acrylate (HPA), and 2-hydroxyethyl acrylate (2-HEA), which are low boiling point diluent type reactive monomers, and may be mixed with a photoinitiator (for example, 1-hydroxycyclohexyl phenylketone, and the like) or an antioxidant as the additive. However, the above description is merely an example. In addition, the resin layer of the present disclosure may be formed of all resins that may be currently developed and commercialized or may be implemented according to future technology development and may perform light diffusion function.

Meanwhile, the resin layer of the present disclosure may further include a plurality of beads having hollows (or pores) formed therein, in a mixed and diffused form, and such beads serve to improve reflection and diffusion characteristics of light. For example, when a light beam emitted by the light source 130 is input to the beads in the resin layer, the light beam is reflected and penetrated by the hollows of the beads, is diffused and collected, and is emitted to the upper side. At this time, since reflectivity and diffusivity of light increase by the beads, a light quantity and uniformity of an emitted light may increase. As a result, brightness of the lighting device may be improved.

Although the content of such beads may be properly adjusted to obtain a desired light diffusion effect, and more particularly, may be adjusted in a range of 0.01% to 0.3% with respect to the entire weight of the resin layer, the present disclosure is not limited thereto. That is, the light beam emitted by the light source 130 in a lateral direction may be diffused and reflected through the resin layer and the beads, and may proceed in an upward direction. Although such beads may be any one selected from silica, glass bubble, PMMA, urethane, Zn, Zr, $Al_2O_3$, and acryl, and the particle diameter of the beads may be in a range of 1 μm to 20 μm, the present disclosure is not limited thereto.

According to the present disclosure, since the thickness of the conventional light guide plate may be innovatively reduced due to the presence of the resin layer, the entire product may be thinned, and may have ductility, so that the product may be easily applied even to a curved surface, a degree of freedom of design may be improved, and the product may be applied even to other flexible displays.

In addition, in a structure of FIG. 2, the light source module 100 according to the embodiment of the present disclosure may further include a diffusion member 150 arranged on the second light guide member 140 toward the light emitting surface A. Furthermore, the light source module 100 may further include an optical pattern 160 between a lower portion of the diffusion member 150 and the light guide member 140. The optical pattern 160 may be formed on a surface of the second light guide member 140 or may be formed on a surface of a transparent optical sheet 161.

Alternatively, unlike this, the optical pattern 160 may be arranged between a pair of optical sheets 161 and 162 as illustrated in FIG. 2. The optical pattern 160 basically functions to inhibit a light beam emitted by the light source 130 from being focused. Such an optical pattern 160 may be formed as a light shielding pattern such that a light shielding effect may be partially realized to inhibit a phenomenon in which optical characteristics deteriorate or a yellow light beam is emitted since an intensity of light is excessively strong. Such a light shielding pattern may be printed on the upper surface of the light guide member 130 using light shielding ink or may be formed by performing a printing process on the upper surface or the lower surface of the optical sheet.

The optical pattern 160 may be realized to adjust light shielding degree or diffusivity of light such that the light beam is not completely blocked but the light beam is partially shielded and diffused. Furthermore, in more detail, the optical pattern 160 according to the present disclosure may be realized in an overlapping printing structure having a complex pattern. The overlapping printing structure refers to a structure in which one pattern is formed and one pattern shape is printed on the pattern. As an example, the optical pattern 160 is realized in an overlapping structure including a diffusive pattern formed on a lower surface of a polymer film in a light emitting direction using light shielding ink including one or more materials selected from $TiO_2$, $CaCO_3$, $BaSO_4$, $Al_2O_3$, and silicon and a light shielding pattern formed using light shielding ink including Al or a mixture of Al and $TiO_2$.

That is, after the diffusive pattern is formed on the surface of the polymer film by white printing, the light shielding pattern is formed on the diffusive pattern. Alternatively, a dual structure may be formed in a reverse order. Of course, it is apparent that such a pattern formed design may be variously changed in consideration of efficiency, an intensity, and a light shielding rate of light. Alternatively, a triple structure may be formed in which in a sequential laminated structure, a light shielding pattern which is a metal layer is formed on an intermediate layer and diffusive patterns are formed on and beneath the light shielding pattern. Such a triple structure may be implemented by selecting the above-described materials. As an exemplary example, efficiency and uniformity of light may be secured through the triple structure in which one of the diffusive patterns is implemented using $TiO_2$ having an excellent refractive index, the other diffusive pattern is implemented using $CaCO_3$ having light stability and a color sense together with $TiO_2$, and the light shielding pattern is implemented using Al having excellent concealment. In particular, $CaCO_3$ finally functions to implement a white light beam through a function of reducing exposure of the yellow light beam, so that more stable efficiency of light may be implemented. Inorganic materials having large particle sizes and similar structures, such as $BaSO_4$, $Al_2O_3$, Silicon bead, and the like, in addition to $CaCO_3$ may be utilized. In addition, it is preferable in terms of light efficiency that the optical pattern 160 is formed by adjusting pattern density such that the pattern density is lowered as the optical pattern 160 becomes further away from the light emitting direction of the light source 130.

Thus, as illustrated in FIGS. 2 and 1, the light beam emitted by the light emitting element 130 of the light source module 100 is emitted through the opening area through an indirect light beam c emitted and reflected toward a lower side of the shielding module and direct light beams a and b transmitted through the second light guide member 140.

Figure 3:
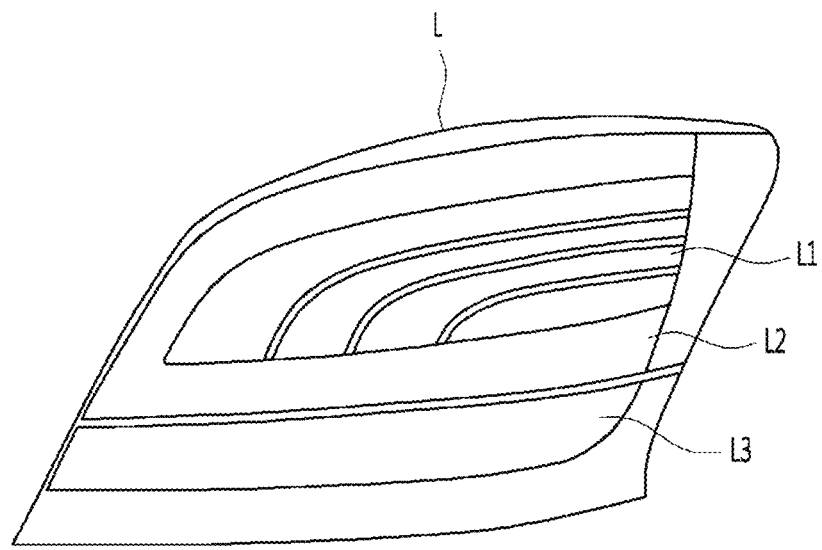
FIG. 3 is a view illustrating a vehicular lamp to which the lighting device according to the present disclosure is applied.

FIG. 3 is a view illustrating, as an example, a structure of a vehicular lamp L to which the lighting device according to the embodiment of the present disclosure is applied. A light emitting area that emits a light beam through the opening area by applying the indirect light beam inside the light source module as illustrated in FIG. 1 may be arranged and applied to areas L1 to L3 of various lamps requiring light emission as illustrated in FIG. 2.

In this way, the lighting device according to the present disclosure may be applied to various lamp devices requiring lighting, for example, a vehicular lamp, a household lighting device, and an industrial lighting device. For example, when the lighting device is applied to the vehicular lamp, the lighting device may be applied to a headlight, a vehicle interior lighting device, a door scuff, a rear light, and the like. Additionally, the lighting device of the present disclosure may be applied even to a backlight unit applied to a liquid crystal display, and may be additionally applied to all lighting-related fields that is currently developed and commercialized or may be implemented in the future according to technology development.

As described above, in the detailed description of the present disclosure, detailed embodiments have been described. However, various modifications may be made without departing from the scope of the present disclosure. The technical spirit of the present disclosure is not limited to the above-described embodiments of the present disclosure, and should be defined by equivalents to the appended claims as well as the appended claims.

INDUSTRIAL AVAILABILITY

Lighting lamp, and vehicular lamp
The invention claimed is:
1. A lighting device comprising:
a shielding module including an opening area in an upper portion of the shielding module and a shielding area extending from the opening area, and including a lower surface portion, side surface portions extending upward from the lower surface portion, and bent portions bent from the side surface portions and defining the opening area;
light source modules arranged between the lower surface portion and the bent portions of the shielding module;
a first light guide member arranged on light emitting surfaces of the light source modules inside the shielding module; and
a lens arranged on the first light guide member such that a lower surface of the lens is in contact with an upper surface of the first light guide member and a part of an upper surface of the lens is in contact with inner surfaces of the bent portions,
wherein light emitting directions of light emitting elements inside the light source modules form an inclination angle with the light emitting surfaces of the light source modules, the inclination angle being defined as an angle between virtual vertical lines W2 passing through centers of the light emitting elements and virtual extending lines W1 of the light emitting surfaces of the light source modules,
wherein a length of each bent portion is longer than a transverse width of each light source module,
wherein a transverse width of the lens is longer than a transverse width of the first light guide member, and the transverse width of the lens is longer than a transverse width of the opening area,
wherein the lighting device comprises a central region within imaginary vertical lines extending downwardly, in a vertical direction parallel to the side surface portions of the shielding member, from a perimeter of the opening area of the shielding module towards the lower surface portion of the shielding module, the central region having at least a portion of the first light guide member and at least a portion of the lens disposed therein, and
wherein the light source modules are disposed entirely below the bent portions, and the light source modules are absent from the central region of the lighting device.

2. The lighting device of claim 1, wherein each of the light source modules includes:
a light source including a light emitting element;
a printed circuit board on which the one or more light sources are mounted;
a second light guide member arranged on the printed circuit board; and
a diffusive member arranged on the second light guide member.

3. The lighting device of claim 2, wherein the second light guide member includes a plurality of beads therein.

4. The lighting device of claim 3, wherein a content of the beads ranges from 0.01% to 0.3% with respect to an entire weight of the lighting device.

5. The lighting device of claim 2, wherein each of the light source modules includes an optical pattern disposed between the printed circuit board and the second light guide member.

6. The lighting device of claim 1, wherein the inclination angle ranges from 90 degrees to 180 degrees.

7. The lighting device of claim 6, wherein the light source modules are disposed adjacent to insides of the side surface portions of the shielding module to be opposite to each other.

8. The lighting device of claim 7, wherein the first light guide member is disposed between the light source modules disposed opposite to each other.

9. The lighting device of claim 1, wherein first areas of the bent portions of the shielding module vertically overlap with the lens and the first light guide member.

10. The lighting device of claim 9, wherein end side surfaces of the bent portions vertically overlap with the first light guide member.

11. The lighting device of claim 9, comprising:
a reflective member disposed between the first light guide member and the lower surface portion,
wherein the reflective member is disposed between side surfaces of the first light guide member, a lower surface of the lens module, and the lower surface portion.

12. The lighting device of claim 1,
wherein second areas of the bent portions of the shielding module vertically overlap with the lens and the light source modules.

13. The lighting device of claim 1, wherein side surfaces of the lens are in contact with the side surface portions.

14. The lighting device of claim 1, wherein the shielding module is formed of a reflective material including any one of Al, PC, PP, ABS, and PBT.

15. The lighting device of claim 1, wherein the light guide member is a photocurable type resin layer or a thermosetting type resin layer.

16. A lighting device comprising:
a shielding module including an opening area in an upper portion of the shielding module and a shielding area extending from the opening area, and including a lower surface portion, side surface portions extending upward from the lower surface portion, and bent portions bent from the side surface portions and defining the opening area;
light source modules arranged between the lower surface portion and the bent portions of the shielding module;
a first light guide member arranged on light emitting surfaces of the light source modules inside the shielding module; and
a lens module arranged on the first light guide member such that a lower surface of the lens module is in contact with an upper surface of the first light guide member and a part of an upper surface of the lens module is in contact with inner surfaces of the bent portions,
wherein light emitting directions of light emitting elements inside the light source modules form an inclination angle with the light emitting surfaces of the light source modules, the inclination angle being defined as an angle between virtual vertical lines W2 passing through centers of the light emitting elements and virtual extending lines W1 of the light emitting surfaces of the light source modules,
wherein each of the light source modules includes:
a light source including a light emitting element;
a printed circuit board on which the one or more light sources are mounted;
a second light guide member arranged on the printed circuit board; and
a diffusive member arranged on the second light guide member, and
wherein an optical pattern is disposed between transparent optical sheets between the second light guide member and the diffusive member.

17. The lighting device of claim 16, wherein the optical pattern has lower pattern density as the optical pattern becomes further away from a light emitting direction of the light emitting element.

18. The lighting device of claim 17, wherein the optical pattern includes an overlapping printing structure.

19. The lighting device of claim 18, wherein the optical pattern includes a diffusive pattern formed using light shielding ink including one or more materials selected from $TiO_2$, $CaCO_3$, $BaSO_4$, $Al_2O_3$, and silicon and a light shielding pattern formed using light shielding ink including Al or a mixture of Al and $TiO_2$.

20. A vehicular lamp comprising a lighting device including:
a shielding module including an opening area thereon and a shielding area extending from the opening area, the shielding module including a lower surface portion, side surface portions extending upward from the lower surface portion, and bent portions bent from the side surface portions and defining the opening area;
a light source module disposed inside the shielding module and including a second light guide member in which a light emitting element is embedded;
a first light guide member disposed inside the shielding module and being in contact with a light emitting surface of the light source module; and
a lens arranged on the first light guide member such that a lower surface of the lens is in contact with an upper surface of the first light guide member,
wherein an inclination angle is formed between a light emitting direction of the light emitting element and the light emitting surface of the light source module,
wherein a length of each bent portion is longer than a transverse width of the light source module,
wherein a transverse width of the lens is longer than a transverse width of the first light guide member, and the transverse width of the lens is longer than a transverse width of the opening area,
wherein the lighting device comprises a central region within imaginary vertical lines extending downwardly, in a vertical direction parallel to the side surface portions of the shielding member, from a perimeter of the opening area of the shielding module towards the lower surface portion of the shielding module, the central region having at least a portion of the first light guide member and at least a portion of the lens disposed therein, and
wherein the light source module is disposed entirely below the bent portions, and the light source module is absent from the central region of the lighting device.

* * * * *